United States Patent [19] [11] 4,345,381
Brislin [45] Aug. 24, 1982

[54] UNIVERSAL MEASURING TEMPLATE

[76] Inventor: Patricia C. Brislin, 1770 Hidden La., Lancaster, Pa. 17603

[21] Appl. No.: 119,722

[22] Filed: Feb. 8, 1980

[51] Int. Cl.[3] ........ G01B 3/14

[52] U.S. Cl. ........ 33/174 G; 428/914; 33/DIG. 10

[58] Field of Search ........ 33/347, 180 R, 174 G, 33/197, DIG. 10, 189, 191; 29/406, 407; 428/40, 343, 137, 138, 914; 248/467, 205 A; 24/67 AR

[56] References Cited

U.S. PATENT DOCUMENTS

| | | | |
|---|---|---|---|
| 2,486,593 | 11/1949 | Gardner | 248/467 X |
| 2,898,688 | 8/1959 | Cottar | 33/197 X |
| 2,957,637 | 10/1960 | Hosken | 24/67 AR |
| 3,126,776 | 3/1964 | Whistler et al. | 33/189 X |
| 3,526,947 | 9/1970 | Pasek | 33/174 G |

FOREIGN PATENT DOCUMENTS

| | | | |
|---|---|---|---|
| 408315 | 9/1966 | Sweden | 248/205 A |

*Primary Examiner*—Harry N. Haroian
*Attorney, Agent, or Firm*—Sughrue, Mion, Zinn, Macpeak & Seas

[57] ABSTRACT

A universal measuring template for use in in-place marking and locating utility outlet openings, window and door cutouts and the like in construction panels comprising a perforated carrier having a film of adhesive applied to one face thereof. The perforations in the carrier control the ratio of adhesive areas exposed to one transfer surface. A gauge variation is developed within the template by the thickness of material used and the adhesive film. A first adhesive bond is created utilizing the least adhesive area exposed through the perforations on one surface of the template and a second adhesive bond is created utilizing the greatest adhesive covered area on the other surface. The first adhesive bond is developed on a utility box perimeter or other surface area and the second bond is developed on a building panel. A greater bond is developed on the building panel surface due to the greater adhesive covered surface area being extended to said panel surface. Thus, when the template is adhered to a utility box perimeter or other surface the bond created thereon will not be as great as the bond which will be created on the blind side of a building panel when the building panel is pressed against the template. By this construction the template will readily transfer from a utility box or other surface to a building panel.

10 Claims, 18 Drawing Figures

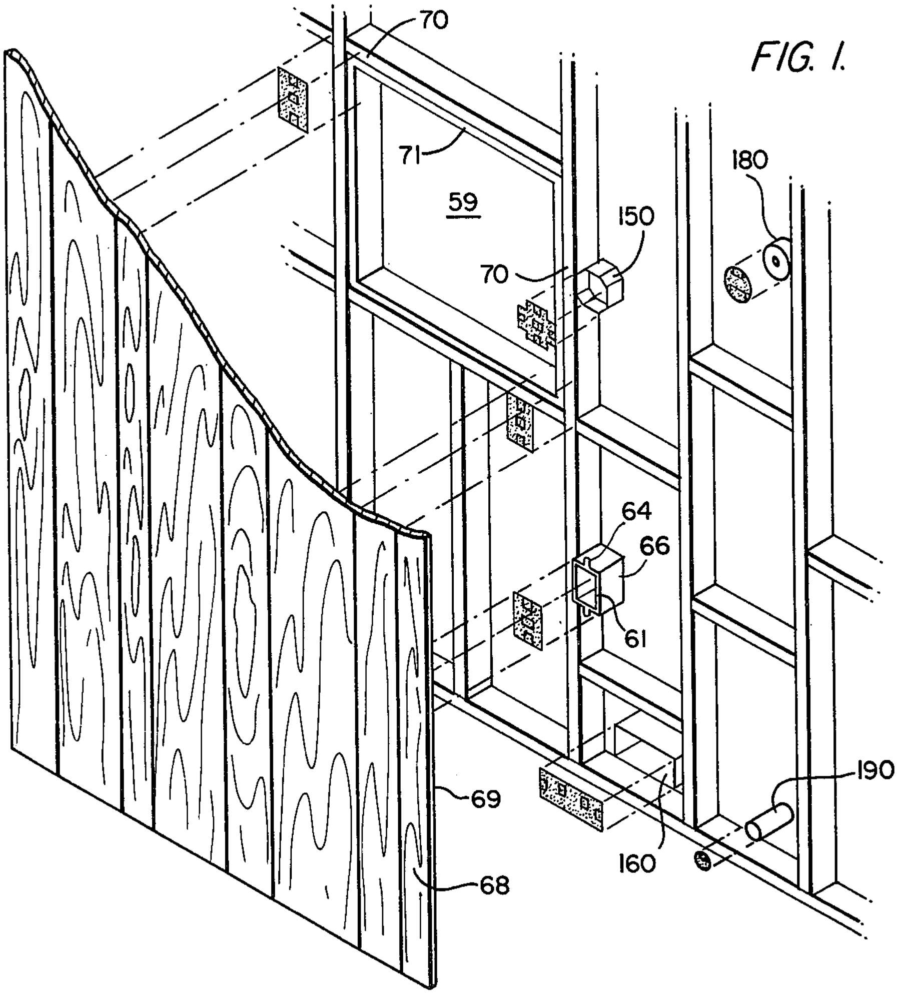
FIG. 1.
FIG. 2.
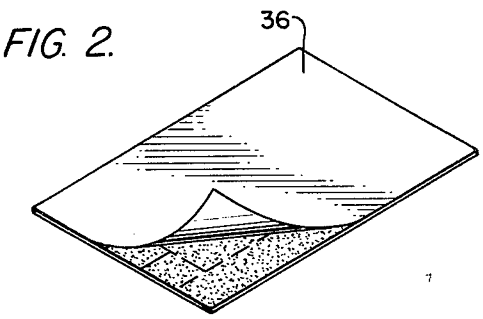
FIG. 3.
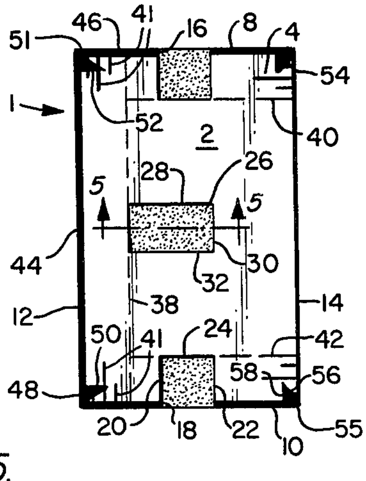
FIG. 4.
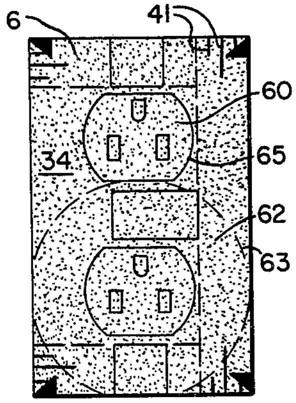
FIG. 5.
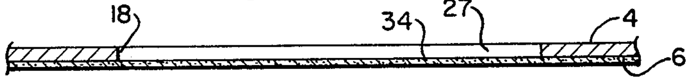

UNIVERSAL MEASURING TEMPLATE

BACKGROUND OF THE INVENTION

1. Field of the Invention

This invention relates to a transferable measuring template of the type for marking and locating utility outlet openings, window and door openings in construction panels. The device will accurately in-place locate points of reference or template on the blind side of construction panels which are to be fastened to wall studding without the need for transposing measurement data from one surface to another and without the need for measuring tools.

2. Statement of the Prior Art

Templates which have been used in the past were impractical, did not lend themselves for use in different applications, were difficult to use, hazardous due to possible personal injury to the user, and failed to provide simple, efficient and positive devices for accurately outlining and marking an opening to be formed in construction paneling for utility outlets, door and window openings and other applications where hardware locations and cutouts are desired. Prior art which discloses devices for locating utility cutouts, hardware placement markings and the like are disclosed in the following list of patents:

| | | |
|---|---|---|
| 4,059,905 | J. H. Wieting | 11/29/77 |
| 3,913,235 | M. T. Tenneson | 10/21/75 |
| 3,745,664 | L. G. Altseimer | 7/17/73 |
| 3,526,947 | F. S. Pasek | 9/8/70 |
| 3,105,985 | J. B. Reid et al | 10/8/63 |

The above listed patents (except '985) show various means for locating and marking hardware and utility outlets used in construction environments. The use of templates employing pins for marking the blind side of construction paneling is unsatisfactory from application, simplicity and construction viewpoints. Furthermore, use of devices which employ pins or spikes can be dangerous in that personal injury can easily occur to the user.

Templates having opposed pressure sensitive faces of different adhesive power will not perform satisfactorily or consistently with conventional building materials due to the adverse climate conditions often encountered at construction sites. Furthermore, the greater the pressure that is applied to the templates having opposed pressure sensitive faces during the transfer operation causes a greater initial bond on the utility outlet, door or window opening framing such as to work against the successful transfer of the template to the blind side of a construction panel.

The prior art devices which utilize pressure sensitive surfaces employ weak removable adhesives which will not bond readily to the small surface area provided by the perimeter of utility outlet boxes or pipe cross-sections. Often, the weak adhesives used with these devices will leave undesirable residues on wood surfaces around window frames and door jams which subsequently interfere with the finishing or staining of those surfaces. Weak adhesives used in those prior art devices will not permit the template to remain in place for extended periods of time due to creep and susceptibility to temperature, humidity and wind variations. In addition, the user of these prior art devices cannot control the surface area or the bonding pressure applied to the surface area contacting the utility device and the surface area contacting the blind side of a panel.

Thus, the prior art devices have serious limitations and shortcomings in utility, application, construction and cost. Applicant's invention is designed and constructed to overcome the limitations in the prior art devices as will become clear from a careful reading of the specification and claims herein below.

SUMMARY OF THE INVENTION

The present invention is concerned with the construction of simple, efficient, safe and inexpensive devices for marking and locating utility outlet openings, window and door cutouts and other areas where hardware location markings are desired. The device of the present invention is constructed so as to be utilized without the need of measuring devices or for transposing measurements previously made from utility, door or window locations to the blind side of a panel.

Thus, one object of the present invention is to provide an improved measuring template having simplicity in its construction, versatility in its application and low cost of production.

A second object of the present invention is to provide a measuring device in the nature of a universal measuring template which can be quickly, easily and accurately utilized to mark openings to be formed in building panels and which will overcome the inherent inaccuracies, cumbersomeness and other undesirable drawbacks and disadvantages of the prior art devices.

A third object of the present invention is to provide a template having a perforated carrier having an adhesive film applied to one face thereof. The perforated carrier serves to provide for gauge variation within the template and further serves to space the adhesive film a finite distance from one surface of the template.

A further object of the present invention is to provide a template having a perforated carrier which provides shape and form to the template and permits the attaining of varying ratios of exposed adhesive surface areas on the template surfaces.

A further object of the present invention is to provide a transferable template so constructed as to prevent transfer pressure from affecting the adhesive bond with the utility outlet, or window or door opening framing during transfer to the blind side of a construction panel. This effect occurs due to the differences in areas of adhesive surfaces exposed to the utility outlet, door or window opening framing and the blind side of a construction panel and the gauge variation within the template.

A further object of the present invention is to provide a universal measuring template having measuring indicia mirror imaged on either side of the perforated carrier, said measuring indicia being used as reference points and perimeters for accurately positioning large openings for which a one piece template would be inadequate or impractical. Thus, the use of a plurality of templates at each corner of a window or door opening or the like provides the user with complete control over the measuring tolerances allowed for such cutouts.

Extreme accuracy is thus possible because the construction panel may be positioned within thousandths of an inch of the utility box, window or door framing before the template/s engages the blind side of the panel.

Other and further objects of the present invention will become apparent to those skilled in the art from a consideration of the following specification when read in conjunction with the annexed drawing.

BRIEF DESCRIPTION OF THE DRAWINGS

FIG. 1 is a perspective exploded view showing the template, interior wall studs, utility box and building panel;

FIG. 2 is a plan view of the template showing a removable cover sheet for covering the adhesive film;

FIG. 3 is a plan view of the template showing a perforated carrier exposing adhesive through the perforations on one side of the template;

FIG. 4 is a plan view of the reverse of the template shown in FIG. 3 wherein the entire panel is covered with adhesive;

FIG. 5 is an end view of the template taken along the line 5—5 of FIG. 3 showing the gauge of the template;

DESCRIPTION OF THE PREFERRED EMBODIMENT OF THE INVENTION

Figure 6:
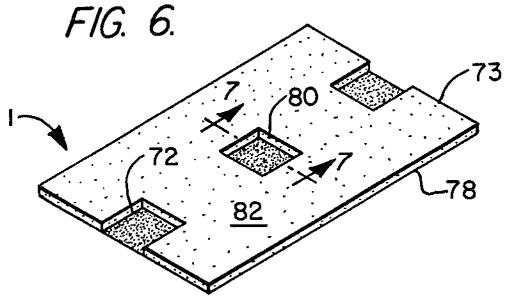
FIG. 6 is an elevated view of the template showing use of a resilient perforated carrier.

A further and more detailed description of the drawings will now be undertaken and with reference to numerals which will designate the various parts of the template.

The template 1 of this invention has an adhesive carrier 2 having front and rear sides 4, 6 and edges 8, 10, 12 and 14. The carrier 2 has at least one perforation therein. The drawings show the carrier having a plurality of perforations 16 and 18 cut therein, located directly opposite each other and positioned equidistantly from edges 12 and 14. Perforations 16 and 18 have edges 20, 22 and 24. Carrier 2 also has a perforation 26 disposed in the center of the carrier between perforations 16 and 18. Perforation 26 has sides 28, 30 and 32. Use of various thicknesses of carrier material will determine the gauge variation within the template so that the amount of pressure exerted on the adhesive exposed through the perforations can be controlled.

Side 6 of the carrier has a coating of adhesive 34 covering the entire surface thereof. The adhesive 34 has adhesive properties on both sides thereof and is free standing in that it forms a film which does not require its own supporting surface as in adhesive tape. The adhesive film 34 spans the perforations 16, 18 and 26 and is exposed on side 4 through the perforations. By this construction, side 4 of carrier 2 will have the least exposed adhesive area while side 6 will have its entire area covered by adhesive. A depressed area 27 will be created between side 4 and the adhesive film spanning the perforations. A releasable panel 36 covers the adhesive 34 on side 6 thus facilitating stacking of the templates together for shipping or storage.

Side 4 of carrier 2 is provided with measuring line indicia 38 which are spaced from edge 12 and extend from edge 8 to edge 10. Measuring indicia lines 40 and 42 intersect and extend from line 38 to edge 14 of the carrier 2. Additional line indicia 44 and 46 are provided adjacent to edges 8, 10 and 12 of the carrier and include triangular members 48 in each corner 51 each having sides 50 and 52 parallel with each other and perpendicular to line 44. Additional triangular direction arrows 54 are provided in corners 55 each having sides 56 and 58, with sides 58 being parallel with edge 14 and perpendicular to line 46. Indicia lines 38, 40, 42 and 46 and triangular members 48 and 54 are utilized as reference points where it is desired to accurately mark the perimeters of large openings 59 such as window or door openings and which will permit complete accuracy as may be required under particular situations or allow for use of different tolerances according to required specifications. Additional indicia lines 41 are used to achieve and maintain individual tolerances which are needed when window jamb structures 71 are encountered.

The indicia lines and triangular members are mirror imaged on the reverse side 6 which side is also provided with electrical outlet opening markings 60 having partial circular line 65 and telephone outlet opening markings 62 having circular line 63. Standard pipe outlet opening markings may be obtained by extending the partial circular line 65 of electrical opening marking 60 to a complete circle. The template may be cut along lines 63 and 65 to obtain templates of circular cross-section for use on telephone outlets 180 and plumbing outlets 190.

In operation, the perforated carrier 2 is secured to the perimeter 61 or tabs 64 of outlet box 66 or other building framing such as studs 70 by pressing the adhesive film 34 which is exposed through perforations 16 and 18 against perimeter 61 or tabs 64 of the outlet box 66 or building framing studs 70. The releasable panel 36 is then removed exposing the adhesive which covers the entire area of side 6. Building panels 68 having blind side 69 in which it is desired to cutout an opening for utility boxes, windows or doors is pressed against studs 70 and against the utility outlet box. Upon removal of panel 68 the template 1 will be secured to the blind side 69 of the panel. An opening may then be cut around the template which will be an accurate match for the outlet box, window or door opening.

The size of the perforations in the carrier, the gauge variation within the template which is a measure of the thickness of the perforated carrier, and the adhesive film allows the user to control both the amount of adhesive surface area exposed to a utility box perimeter or other surface and the amount of pressure to be exerted to develop an adhesive bond against the utility box perimeter, building framing or other surface. While pressure is being applied between side 6 of the template and the blind side 69 of panel 68, no additional adhesive surface area or bonding pressure can be applied to side 4 of the template due to the gauge differential within the template.

Thus, for any given amount of pressure, a greater bond will be achieved on the blind side 69 of panel 68 due to the differential in adhesive surface area exposed to the blind side 69 of panel 68 and the utility box tabs or perimeter or studs 70. Because of this greater bond the template will readily and easily adhere to the blind side 69 of panel 68. When the panel is pulled away from studs 70 and box 66 the template will be adhered thereon, thus accurately marking the area to be cut in the panel. The gauge differential within the template prevents any additional bonding pressure from being applied to side 4 of the carrier during the transfer process.

Figure 7:
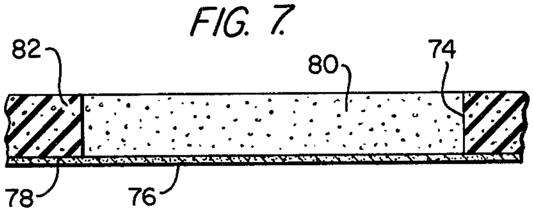
FIG. 7 is an end view taken along the line 7—7 of FIG. 6 showing the ratio of thicknesses between the resilient perforated carrier and the adhesive film.

While the above description of the template of this invention has been described with respect to one type of carrier material, other materials may be used where building conditions require it. In this connection, FIG. 6 and FIG. 7 discloses a template having a resilient carrier 73 having perforations 72 therein which are of equal dimension to each other. The gauge within the template is greater than in the above described template because of the greater thickness 74 of the carrier. An adhesive film 76 covers the entire area of side 78 and spans the perforations 72. A depressed area 80 is created between the adhesive film 76 and side 82 of carrier 73. The resilient carrier of this structure lends itself to providing greater resiliency where it is necessary to compensate between variations within the plane of two surfaces at the point of contact with the template.

Figure 9:
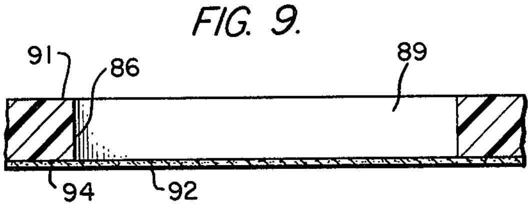
FIG. 9 is an end view taken along the line 9—9 of FIG. 8 showing the ratio of thicknesses between the rigid perforated carrier and the adhesive film.
Figure 8:
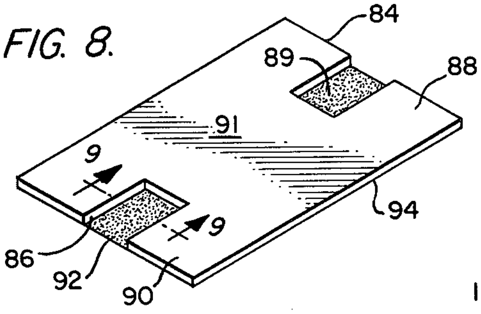
FIG. 8 is a perspective view of the template utilizing a rigid perforated carrier.

FIG. 8 and FIG. 9 disclose a further embodiment of this invention wherein the carrier 84 is composed of rigid material with perforations 86 cut therein. Each of said perforations being located at sides 88 and 90 of the carrier. The adhesive film 92 covers the entire side 94 and spans the perforations 86. A depressed area 89 is developed between the surface 91 of the carrier and the surface of the adhesive film exposed through the perforations 86. This rigid material may be of different thicknesses to provide strength and form to the template. The rigidity is desirable in certain applications where flexibility would prevent proper bonding relationships between utility items or other surfaces and the building panel.

Figure 10:
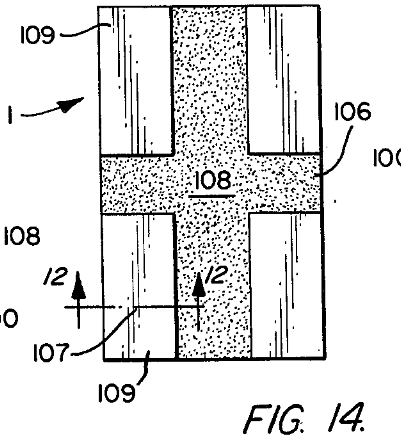
FIG. 10 is a plan view of a modified form of the template showing non-adhesive panels adjacent the corners with exposed adhesive in the remaining areas.
Figure 11:
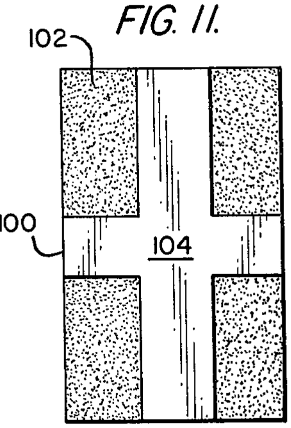
FIG. 11 is the reverse of FIG. 10 and shows adhesive panels adjacent the corners with the remaining area bearing no adhesive.
Figure 12:
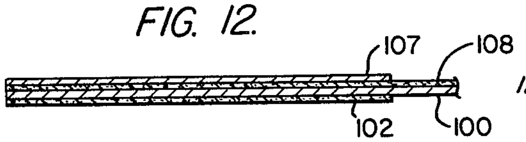
FIG. 12 is an end view of the template taken along the line 12—12 of FIG. 10, showing the template in cross-section.

FIGS. 10, 11 and 12 disclose a further embodiment wherein the template comprises a carrier 100 having rectangular adhesive films strips 102 covering rectangular areas in each quadrant of one side of the template. FIG. 11.

The remaining area 104 represents a cross-like configuration having no adhesive thereon. The opposite side, FIG. 10, of the carrier 100 is entirely covered with adhesive 106. Non-adhesive rectangular panels 107 cover corners 109 of each quadrant leaving a cross-like configuration 108 of exposed adhesive. The adhesive cross-like configuration 108 is utilized to secure the template to a utility box perimeter or other surface. The blind side of a building panel is then pressed against the utility box whereby the adhesive film strips 102 adhere to the panel. Upon removal of the panel, the template will be adhered thereon due to the greater adhesive surface area presented to the panel as opposed to the limited adhesive area exposed to the utility box perimeter or other surface.

Figure 13:
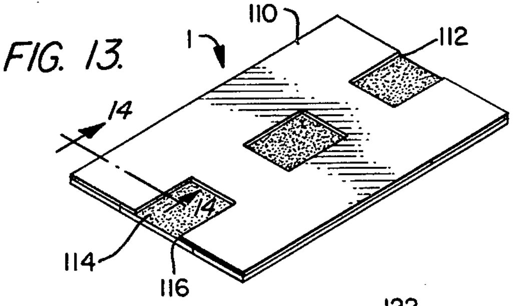
FIG. 13 is a perspective view of another embodiment of the template showing a perforated carrier having a resilient layer between adhesive films.
Figure 14:
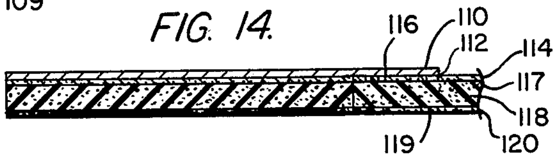
FIG. 14 is an end view taken along the line 14—14 of FIG. 13 and shows the resilient layer positioned between adhesive films.

FIGS. 13 and 14 show a modified form of the invention wherein the template has a carrier 110 having perforations 112 therein. An adhesive film 114 covers the entire area of one side 116 spanning the perforations 112. A foam layer 118 is bonded to the adhesive film 114 on one side 117 thereof and an additional adhesive film 120 covers the entire area of the opposite side 119 of the foam layer. This device finds application wherever flexibility and strength are required, and for compensating for variations in surface contours.

Figure 15:
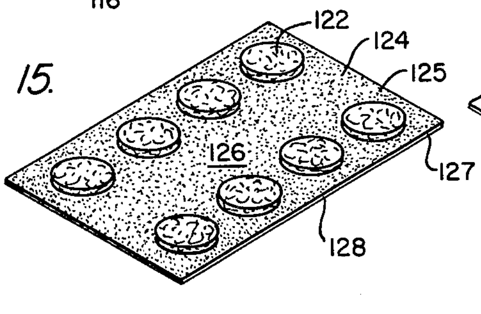
FIG. 15 is a perspective view of a further modification of the template showing a plurality of non-adhesive discs used in lieu of a perforated carrier.

FIG. 15 shows a further modified form of the invention wherein the gauge variation within the template is achieved by utilizing a plurality of discs 122 which are adhered to an adhesive film 124 on one side 125 of carrier 127. The exposed adhesive area 126 is controlled by the size of discs 122 whereas side 128 of the template is completely covered by an adhesive film.

Figure 17:
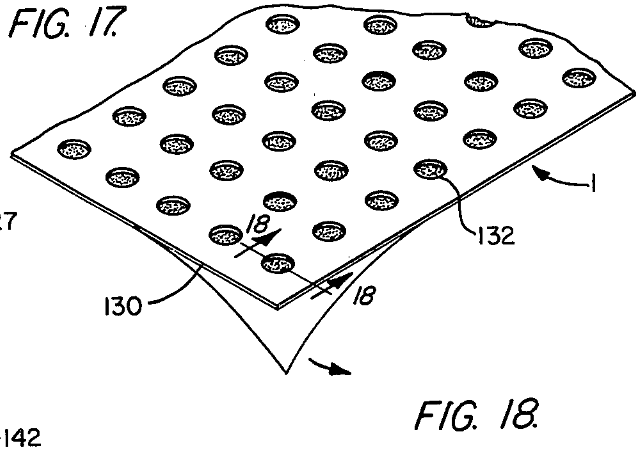
FIG. 17 is a perspective view of a master template showing a perforated carrier and a cover sheet for the adhesive.
Figure 18:
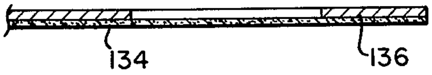
FIG. 18 is an end view taken along the line 18—18 of FIG. 17 showing the ratio of the thicknesses between the perforated carrier and the adhesive film.

FIGS. 17 and 18 show a master template which comprises a carrier 130 having a plurality of perforations 132 therein. An adhesive film 134 completely covers side 136 with limited adhesive area being exposed through perforations 132. The gauge of this master template may be varied according to the thickness of the materials used. The master template of this structure permits the user to construct various sizes of templates for use according to his specific needs.

Figure 16:
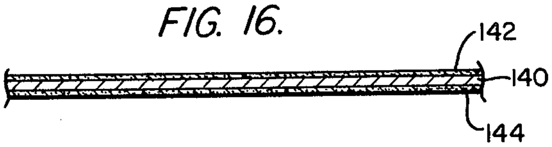
FIG. 16 is an end view of an embodiment of the template showing a layer of material between adhesive films.

FIG. 16 shows yet another variation wherein a carrier 140 has a plurality of adhesive films 142 and 144 on either side thereof. The carrier 140 of this structure is comprised of rupturable material. The rupture will occur through the plane of the carrier, between the adhesive films and parallel thereto when opposing pressure is applied between the adhesive film 142 which is secured to a utility box perimeter or other surface and the adhesive film 144 which is secured to the blind side of a panel. This structure may be utilized where it is desirable to mark areas which will be cutout in a building panel and in surfaces behind the panel such as solid wood areas or other solid wall structures where it is desired to match cutouts in those surfaces with a building panel.

The templates thus constructed can be adhered together to form templates of various geometrical forms for use on octagonal light outlet boxes 150, air return outlets 160 and any other utility outlets used in building constructions. Furthermore, the template of this invention will transfer from and to a wide variety of porous and non-porous surfaces such as paper, wood, plastic, metal and glass which are normally used as building materials.

It can be readily seen and understood that the template of this invention is versatile, simple to use, accurate to a fraction and inexpensive to manufacture. The device can be used over and over again by any one without loss of its attributes or qualities.

Many other possible embodiments of this invention may be made of the device of this invention without departing from the scope thereof, it is to be understood that all matter herein set forth or shown in the accompanying drawings is to be interpreted as illustrative and not in a limited sense.

What is claimed is:

1. A transferable universal template for marking and locating utility outlet, window and door openings in construction panels comprising:

a carrier of flexible material having front and rear sides;

a plurality of perforations in said carrier; and a film of adhesive covering the rear side of said carrier and spanning said perforations, said film of adhesive having adhesive properties on both sides thereof whereby the adhesive portions exposed through said perforations on the front side being less than the adhesive on the rear side whereby said template is transferable from one surface to another.

2. A transferable universal template as defined in claim 1, wherein:

said perforated carrier comprises resilient deformable material.

3. A transferable universal template as defined in claim 1, wherein:

said carrier has a substantial number of perforations within its periphery and said adhesive film having adhesive properties on both sides thereof covers the rear side of said carrier and covers the perforations, said carrier having said substantial number of perforations and said adhesive film define a master template whereby a user may fashion other templates of various geometry to transfer from one surface to another depending on construction requirements.

4. A transferable universal template as defined in claim 1, wherein:

said carrier may be adhered to other carriers of similar structure to form larger templates of different geometry for use in transferring from electrical light outlet boxes and air return outlets to construction panels.

5. A transferable universal template as defined in claim 1, wherein:

said template is transferable from porous supporting surfaces of various geometry and contours to non-porous surfaces.

6. A transferable universal template as defined in claim 1, wherein:

said perforated carrier comprises rigid material.

7. A transferable universal template for marking and locating utility outlet, window and door openings in construction panels comprising:

a carrier of flexible material having front and rear sides;

a plurality of perforations in said carrier;

a film of adhesive covering the rear side of said carrier and spanning said perforations, said adhesive film having adhesive properties on both sides thereof whereby the adhesive portions exposed through said perforations on the front side being less than the adhesive on the rear side whereby said template is transferable from one surface to another; and a plurality of measuring graduations and markings on the carrier surfaces.

8. A transferable universal template as defined in claim 7, wherein:

said markings define electrical utility outlet indicia; and said carrier being severable along said electrical utility outlet indicia to form circular templates for use in transferring from telephone outlets and plumbing conduits to construction panels.

9. A transferable universal template for marking and locating utility outlet, window and door openings on the blind side of construction panels comprising:

a carrier of flexible material having front and rear sides;

a plurality of perforations in said carrier;

an adhesive film on said rear side of said carrier spanning said perforations, said adhesive film having adhesive properties on both sides thereof;

a resilient material bonded on one side thereof to said adhesive film on the rear side of said carrier;

an adhesive film on the other side of said resilient material; and said adhesive film on the rear side of the carrier having adhesive portions exposed through said perforations on the front side, said adhesive portions being less than the adhesive on the other side of said resilient material whereby said template is transferable from one surface to another.

10. A transferable universal template for marking and locating utility outlet, window and door openings in construction panels comprising:

a carrier of flexible material;

an adhesive covering one surface of said carrier;

a plurality of non-adhesive panels secured to said adhesive and covering areas in each quadrant of said one surface of said carrier, said covered areas in each quadrant being less than the entire area of said surface leaving the remaining surface area consisting of adhesive;

adhesive applied to and covering areas in each quadrant of the other surface of said carrier, said areas corresponding with the non-adhesive panels on the reverse side, said adhesive covered areas being less than the entire surface area of said other side with the remaining surface area being a non-adhesive area;

said adhesive areas of said one surface firstly adhered to a utility box perimeter or other surface and said adhesive areas on said other surface subsequently adhered to the blind side of a construction panel when said panel is pressed against the utility box perimeter or other surface bearing the template, the transfer of said template from the utility box perimeter or other surface to the blind side of a construction panel being due to the difference in adhesive areas engaged with said utility box perimeter or other surface and said blind side of said construction panel; and said flexible carrier, adhesive area, non-adhesive panels and corresponding adhesive areas being operable to control the gauge within said template.

* * * * *